(12) United States Patent
Obin et al.

(10) Patent No.: US 6,526,569 B1
(45) Date of Patent: Feb. 25, 2003

(54) METHOD FOR COMPILING A PROCEDURAL PROGRAM TO AN OBJECT CLASS DEFINITION

(76) Inventors: Raymond Obin, Wash Water, Newbury, Berkshire, RG15 0LY (GB); Brian Reynolds, Round Hill, P.O. Box 64, Montego Bay (JM)

( * ) Notice: Subject to any disclaimer, the term of this patent is extended or adjusted under 35 U.S.C. 154(b) by 0 days.

(21) Appl. No.: 08/812,415

(22) Filed: Mar. 6, 1997

Related U.S. Application Data

(63) Continuation of application No. 08/365,229, filed on Dec. 28, 1994, now abandoned, which is a continuation-in-part of application No. 08/175,951, filed on Dec. 30, 1993, now abandoned.

(51) Int. Cl.[7] ................................................ G06F 9/45
(52) U.S. Cl. ....................................................... 717/140
(58) Field of Search ................................. 395/705, 707, 395/708, 702, 703; 717/136, 140

(56) References Cited

U.S. PATENT DOCUMENTS

| | | | | |
|---|---|---|---|---|
| 4,827,404 A | * | 5/1989 | Barstow et al. | 364/200 |
| 5,428,792 A | * | 6/1995 | Conner et al. | 395/700 |
| 5,446,902 A | * | 8/1995 | Islam | 395/700 |
| 5,509,116 A | * | 4/1996 | Hiraga et al. | 707/1 |

OTHER PUBLICATIONS

Waters, R., "Program Translation via Abstraction and Reimplementation", IEEE Transactions on Software Engineering, vol. 14, No. 8, pp. 1207–1228, Aug. 1988.*

Lathrop et al, "Advances in functional abstraction from structure", 25th ACM/IEEE Design Automation Conference, pp. 708–711, Jun. 1988.*

Ong et al, "Class and object extraction from imperative code", Journal of Object Oriented Programming, vol. 6, Issue 1, pp 58(10), Mar. 1993.*

Sneed, H., "Migration of Procedurally Oriented COBOL Programs in an Object Oriented Architecture", Software Maintenance, 1992 IEEE Conference, pp. 105–116, Nov. 1992.*

Arseneau, J., "An Artificial Neural Network Based Software Reengineering Tool for Extracting Objects", Neural Networks, 1994 IEEE Conference, pp. 3888–3893, vol. 6, Jun. 1994.*

Sneed, H.M., "Migration of Procedurally Oriented COBOL Programs in an Object–oriented Architecture," IEEE Conf., on SW Maintenance, IEEE Comp. Soc. Press, pp. 105–116, Nov. 1992.*

Liu et al., "Identifying Objects in a Conventional Procedural Language: An Example of Data Design Recovery," IEEE Conf. on SW Maintenance, IEEE Comp. Soc. Press, pp. 266–271, Nov. 1990.*

(List continued on next page.)

*Primary Examiner*—Gregory A. Morse
*Assistant Examiner*—John Q. Chavis
(74) *Attorney, Agent, or Firm*—Calvin B. Ward

(57) ABSTRACT

A method of operating a computer to generate an object class definition from a procedural program having a main program and a plurality of procedures. The invention determines a set of procedures, including at least one procedure that is actually called by the procedural program during the execution of the main program thereof. The resulting object definition has a main method or procedure that reproduces the behavior exhibited by the procedural program when the main method is invoked or the main procedure is executed. In addition, the invention generates a method in the object class definition corresponding each procedure in the procedural program that is actually used in the procedural program.

5 Claims, 1 Drawing Sheet

OTHER PUBLICATIONS

Figure 1:
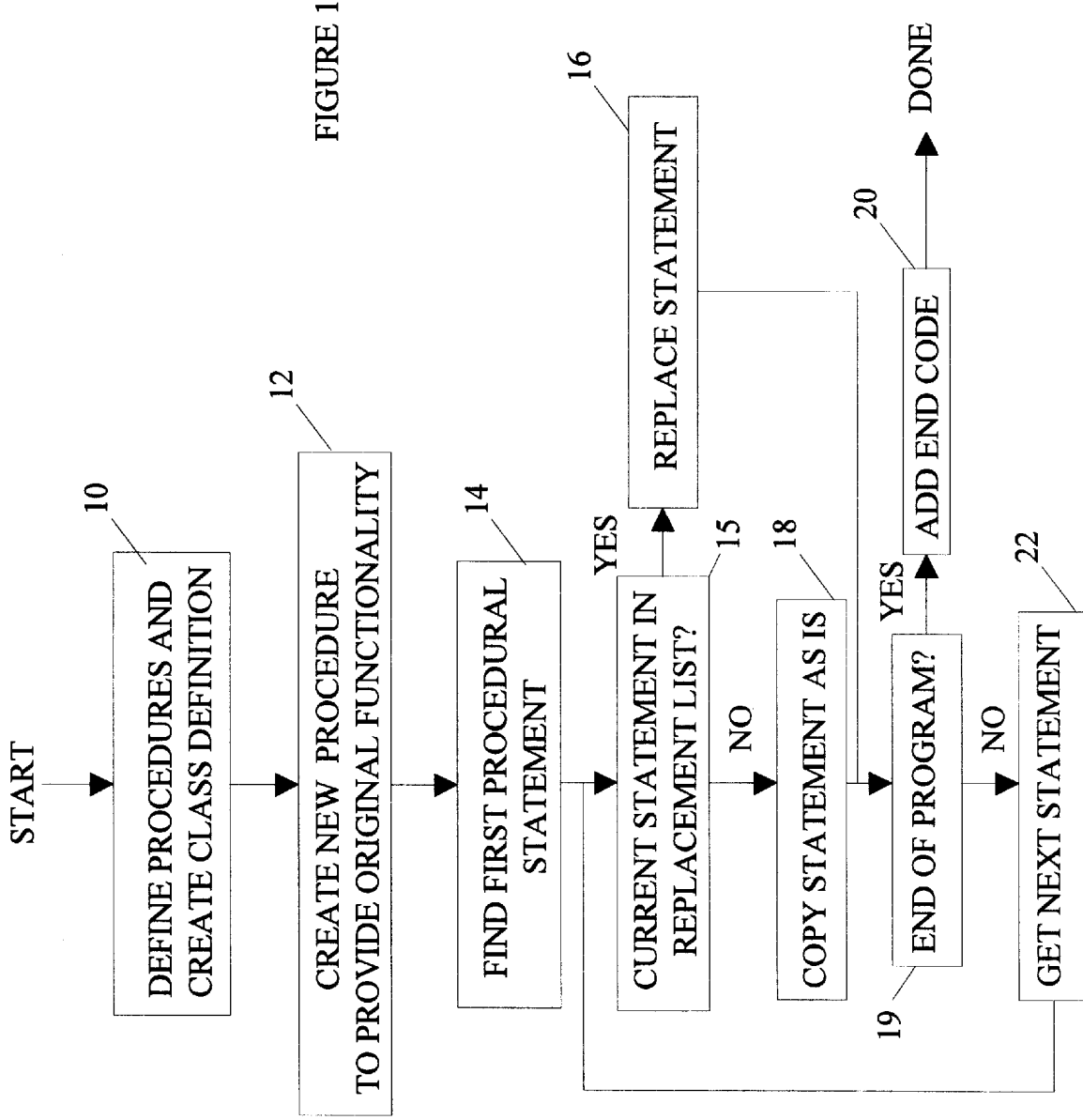

Bobrow, et al., "CommonLoops Merging Lisp and Object-Oriented Programming," OOPSLA '86, ACM, pp. 1–23, Oct. 1986.*

Cox, et al., "Producer A Tool for Translating Smalltalk–80 to Objective–C," OOPSLA '87, ACM, pp. 1–12, Oct. 1987.*

Ong, et al., "Class and Object Extraction from Imperative Code," Journal of Object Oriented Programming, Sigs Pubs., pp. 58–68, Jun. 1996.*

Arseneau, et al., "An Artificial Neural Network Based Software Reengineering Tool for Extracting Objects," IEEE Int. Conf. on Neural Nets, pp. 3888–3893, Jul. 1994.*

* cited by examiner

METHOD FOR COMPILING A PROCEDURAL PROGRAM TO AN OBJECT CLASS DEFINITION

RELATED APPLICATIONS

This a continuation of application Ser. No. 08/365,229 filed on Dec. 28, 1994, now abandoned.

This patent application is a continuation-in-part of U.S. patent application Ser. No. 08/175,951, filed Dec. 30, 1993.

FIELD OF THE INVENTION

The present invention relates to computer compilers, and more particularly, to compilers for converting a conventional procedural program into an object class in an object-oriented language.

BACKGROUND OF THE INVENTION

As computer programs have become more complex, programming languages have become "object-oriented" to reduce the complexity of the programming task. In traditional computer programming, the program is divided into data and instructions that operate on the data. In object-oriented programs, structures which combine data and the code operating on that data are combined into "objects". Manipulations of the internal data of the object are carried out by procedures in the code. These procedures are referred to as "methods" in most object-oriented languages. Objects respond to messages that specify the methods to apply to the data. However, an outside entity cannot view or change the data unless the object provides specific methods for accomplishing these functions.

One advantage of object oriented programming is its ability to reuse code and data defined for a similar object. In object-oriented systems classes of objects are linked together in a hierarchical structure. Objects in the structure that are descendent from a particular object inherit the attributes, both data and methods, of the parent class. This structure reduces the work needed to program a new task, since the programmer need only define the differences between a parent class and a new class descendent therefrom.

In addition, the programmer can override any inherited method. This feature is particularly useful in providing libraries of object classes. The author of the library provides default methods for many functions in the library. If an end user wishes to change any default, the user need only define an object that is descendent from one of the library classes and override the default method by a new method in the descendant class.

To setup an efficient object-oriented coding environment, libraries of object classes that can be used by a number of different types of users must be first generated. If the programmer had to write every object definition from scratch, the advantages of object-oriented programming would be significantly reduced. As noted above, the ability to define a new class which is identical to the parent class with specific methods of the parent class replaced by new methods defined in the new class is particularly useful in providing libraries. The author of a library can provide default methods for those methods that can be overwritten by objects descendant from a particular parent task. If the programmer wishes to change a particular default, the programmer need only define a new class descendent from the corresponding library class, and place the new methods in the new class. Any method in the new class that has the same name as a method in the library class will override that method in the library class. Thus software vendors can sell libraries that may be more easily modified than conventional code libraries. This allows the library code to be reused by a broader range of applications than the equivalent code in a conventional library scheme.

Another advantage of object-oriented code systems lies in security for those portions of the code that author does not wish to become public. In principle, one could distribute a conventional library in the form of source code. A user could then modify any of the procedures or data in the code. Such systems do not provide a convenient means for the author to allow the end user to alter parts of the code while maintaining the remainder of the source code as a trade secret. First, the library is distributed as object code. Hence, the author need not divulge any of the underlying source code even though the user has the ability to modify the code. Second, object-oriented systems provide the ability to maintain a portion of the code and data as "secret". Only data that is defined to be "public" is visible to the library user. Similarly, only certain methods in the library class may be overridden. Hence, object classes provide much of the flexibility of source code while denying the end user access to the source code.

While object-oriented systems allow data and code reuse between objects, they do not provide a method of utilizing existing non-object oriented code. There is a very large existing pool of conventional programs which represent a significant investment in programming resources. Although this existing program base might be more efficiently implemented as object oriented programs, the cost of reprogramming the existing applications is, in general, too great.

At the same time, the existing code base must be updated as systems evolve. As new features are added to existing programs, it would be advantageous to be able to use object oriented coding methods. However, there is no method for easily combining a non-object oriented program with new code consisting of classes of objects.

Broadly, it is the objective of the present invention to provide an improved object-oriented compiler.

It is a further objective of the present invention to provide a compiler that can convert non-object oriented code into a class of objects.

It is a still further objective of the present invention to provide a means for incrementally evolving existing code while providing the advantages of object-oriented programming techniques.

These and other objects of the present invention will become apparent to those skilled in the art from the following detailed description of the invention and the accompanying drawings.

SUMMARY OF THE INVENTION

The present invention is a method of operating a computer to generate an object class definition from a procedural program having a main program and a plurality of procedures. Broadly, the method determines a set of procedures, including at least one procedure that is actually called by the procedural program during the execution of the main program thereof. The identity of the procedures in the set is preferably stored in the computer during the processing of the procedural program. The method generates an object definition having a main procedure or method that reproduces the behavior exhibited by the procedural program when the main method is invoked or the main procedure is executed. In addition, the present invention generates a method in the object class definition corresponding to at least one of the procedures in the set of procedures.

Embodiments of the present invention that operate on COBOL programs store the identity of the procedures in the set of procedures by storing first, second, and third names for each procedure. The first name provides the identity of the label that marks the start of the procedure, the second name is the last label within the range of the procedure, and the third name is the name of the label following the last label within the range of the procedure. Various statements in the procedural program are translated to code in the object definition. In particular, code is included in the class definition causing a transfer of control to one of the procedures in the set of procedures corresponding to each GO TO statement in the procedural program. Similarly, method terminating code is added to the object class definition for each statement in the procedural program which declares one of the third names. In addition, method header code is added to the object class definition for each statement in the procedural program which declares one of the first names or one of the third names. Also, code is added to the object class definition corresponding to each statement in the procedural program that causes the execution of one of the procedures in the set of procedures. This code invokes a corresponding method in the object class definition.

BRIEF DESCRIPTION OF THE EMBODIMENTS

FIG. 1 is a flow chart for a code translation program according to the present invention.

DETAILED DESCRIPTION OF THE INVENTION

The present invention is based on the observation that a conventional procedural program is analogous to an object. In general, the program includes data and various routines that operate on that data. A program that is written in a language having a main program and a number of subroutines may be viewed as an object having a main program method and a method corresponding to each of the subroutines. In normal operation, an object of this class is invoked by the system invoking the main program method in response to a command to execute the program.

The present invention is a method for converting a conventional non-object oriented program to an object class. The method is preferably carried out on a general purpose digital computer. An object of this class that is invoked through the main program method performs exactly as the original program. However, in contrast to the non-object oriented version of the program, one or more of the methods within an object of this class can be invoked by code outside the object thereby allowing the code contained in the original program to be used by other programs. In addition, a new class may be defined to inherit from the object class to allow one or more of the methods in the object class to be overridden. In addition, the present invention allows the new class to be written in either object oriented or non-object oriented syntax.

The general method by which a class definition is generated from a conventional program may be more easily explained with reference to FIG. 1 which is a flow chart of a translation program for generating the class definition code from a conventional procedural program. At the start of the conversion, the translation program determines which procedures are to become methods. The set of procedures that are to become methods that are visible to a calling program, or a program defining a new class from the class defined by the translator, may be all of the subroutines in the program or some subset thereof. In the later case, the programmer can indicate which subroutines are to become public methods by any suitable translator directives. The first step in the translation process is to define the set of procedures as shown at 10.

In addition, the appropriate class definition code header must be inserted in the new class definition. The exact nature of the header will depend on the specific language in which the new class definition is defined. A typical header section for use in a COBOL programming system will be discussed in more detail below.

The next step in the conversion process is to provide a new method that reproduces the original functionality of the program. In general, a program has a main section in which execution commences when the program is invoked. An object, on the other hand, has only methods and data. Hence, a new method or procedure that reproduces the behavior of the main section of the program must be generated by the translator as shown at 12. In the case of a procedural language such as C, this translation can be accomplished by merely providing a new method header at the beginning of the main code section. As will be explained in more detail below, COBOL programs require a somewhat more complex code generation procedure.

The translation process continues as shown at 14 with the first procedural statement after the main section, or, as will be explained in more detail below, at the procedure division of a COBOL program in the case of a COBOL program. The translation program examines each statement as shown at 15 to determine if the statement must be replaced by an equivalent statement in the class definition. If so, the corresponding new code is added to the class definition as shown at 16. If the statement is not in a list of statements that must be replaced, it is copied "as is" to the class definition code as shown at 18.

If the next statement is the end of the program as indicated at 19, the translation program adds the appropriate end code to the class definition as shown at 20. The form of the end code will depend on the particular language in which the class definition is written.

If the end of the program has not been reached, the translation program reads the next statement as shown at 22 and the process is repeated.

Programs written in the COBOL language are somewhat more difficult to convert to object definitions. The structure in COBOL that most closely corresponds to a procedure is a section or paragraph. A paragraph is a sequence of statements that begins with a label. A section is a collection of paragraphs that begins with a label. The end of the paragraph or section is implicitly defined by the start of a new paragraph or section, respectively. A paragraph or section may be invoked by a "PERFORM" statement which is analogous to a call in a procedural language such as FORTRAN in that control is transferred to the first statement after the label and control is returned to the to the next statement after the PERFORM statement when the end of the paragraph or section specified in the PERFORM is encountered.

However, PERFORM statements have two additional levels of complexity. First, a PERFORM statement may be used to execute a range of paragraphs or sections. Consider a program having a section "A" which includes paragraphs "A1", "A2", "A3" followed by a second section labeled "B". PERFORM A THRU B executes the code in sections A and B including all paragraphs in between. Similarly, PER- FORM A1 THRU A2 causes the code in only these two paragraphs to be executed.

In addition to a transfer of control via a PERFORM statement, control can be transferred to a label by a "GO TO" statement. In this case, control is, usually, not returned to the statement after the "GO TO". Instead, the program executes sequentially starting at the label specified in the GO TO statement and continues through the ends of the various paragraphs or sections until the end of the program is reached or some other statement causing control to be transferred in a non-sequential manner is encountered.

This difference between a conventional procedural language and COBOL can be more easily appreciated with reference to the following simple COBOL code sequence.

MAIN SECTION
perform A.
pmove 0 to x.
go to A.
move x to y.
A SECTION.
move 7 to y.
Compute t=y*z.
B SECTION.
move y to z.
compute L=z+8.

The sequence consists of a main section and two paragraphs labeled "A" and "B". The "perform A" statement causes y to be set to the value 7 and t to be set to y * z. Control is then transferred to the next statement after "perform A", i.e., "move 0 to x". The "go to A" statement, in contrast, results in the next statement to be executed after computing the value t to be the first statement of paragraph B, i.e., "move y to z". In fact, the statement after the "go to A" statement will never be executed in the above example, since the above program has no way of returning control to that point in the program.

When a COBOL program is converted to an object class definition in which all of the sections are converted to methods, there is nothing left of the main program control sequence. Each of the resulting methods includes an exit statement which prevents the method from "falling through" to the next method in the program sequence. Hence, a new "method" must be created to reproduce the original program flow.

The manner in which the present invention operates when converting a COBOL program may be more easily understood with reference to a simple program having a procedure division consisting of three sections. The sample program including the various divisions that are typically included in a COBOL program is shown in Table 1. The class definition generated by the present invention from this program is shown in Table 2. The numbers appearing in parentheses at the end of each line in Table 2 indicate the line number in Table 1 that was responsible for the generation of the line in Table 2. For the purposes of the present discussion, the sample program may be viewed as having a header division consisting of the divisions shown at lines 001 through 009 and a PROCEDURE DIVISION having the three sections labeled A, B, and C.

The conversion of the header section to the corresponding header section for a class definition is accomplished by replacing the IDENTIFICATION DIVISION with the corresponding IDENTIFICATION DIVISION for an object class. In the preferred embodiment of the present invention, this requires only that the PROGRAM-ID statement be replaced by a CLASS-ID statement using the same program name and the addition of a "CLASS-OBJECT" to signal the object compiler that the following code defines a class.

In addition, the WORKING-STORAGE SECTION of the header section is expanded to include a control structure having storage space for two method names whose function will be discussed in more detail below. The storage space must be sufficient to hold the name of any method used in the program. These variables are defined at lines 030–032 of the translated code shown in Table 2.

The determination of the procedures within the program will now be explained in more detail. In the preferred embodiment of the present invention, a set of all procedures within the program is defined as follows. Each procedure, denoted by p(n), has three associated names: sName(p(n)) is the name of the label that marks the start of the procedure; eName(p(n)) is the name of the last label within the range of the procedure, and nName(p(n)) is the name of the label following the last label within the range of the procedure. It should be noted that nName(p(n)) is defined to be void if eName(p(n)) is the final label in the program in the preferred embodiment of the present invention.

With one restriction, this set may be dynamically created as the translation program progresses through the program. The restriction is that paragraphs within the program must have unique labels. If this condition is not satisfied, the preferred embodiment of the present invention forces the condition to be true by altering the names of paragraph that appear in more than one section. The set P defines the procedures that will be converted to methods.

The set of procedures is constructed such that p(1) starts at the beginning of the program. The set may be the set of all possible procedures; or it may be only those procedures used by the program. In the preferred embodiment, the translation program user controls how set P is created. Alternatively, the user may define the set to be a proper subset of the set of procedures that are actually called in the program. In this case the translation program ensures that the control flow of the program proceeds as if the set is the minimum set, except that some of the procedures will not be turned into methods.

The set of procedures actually used by the program may be determined in a single pass using the following algorithm:

```
set n = 1
set s = 0
for each label (L) as it is encountered:
    if L is a section label
        if s not = 0
            set nName(p(s)) = L
        end-if
        if n not = s+1
            construct label M = sName(p(s)) followed by "!"
            set nName(p(n−1)) = M
            construct p(n) = {M,sName(p(s)),L}
            increment n
        end-if
        set s = n
    end-if
    if n = s+1
        construct p(n) = {sname(p(s)), <void>, ?}
        increment n
    end-if
    construct p(n) = {L, L, ?}
    if n not = 1 and n not = s
        set nName(p(n−1) = L
    end-if
    increment n
```

-continued

```
end-for
repeat the above loop with L = <void>, a section name
discarding p(n-1) afterwards.
```

Here, the notation p(n)={sName(p(n)), eName(p(n)), nName(p(n))} has been used brevity. The set of procedures for the example shown in Table 1 that is generated by the above algorithm is as follows:

| | | | | |
|---|---|---|---|---|
| p(1) = {A, | A, | B | } | Section A |
| p(2) = {B, | B, | C | } | Section B |
| p(2a) = {B, | <void>, | B1 | } | Start of section B |
| p(2b) = {B1, | B1, | B2 | } | Paragraph B1 |
| p(2c) = {B2, | B2, | B' | } | Paragraph B2 |
| p(2d) = {B', | B, | C | } | End of section B |
| p(3) = {C, | C, | <void> | } | Section C |

It should be noted that p(2a) differs from p(2) in that it includes only the code in section B prior to paragraph B1. It is an incomplete procedure. Hence, p(2a) has no end name.

It should also be noted that, in COBOL, where eName(p(n)) or nName(p(n)) is <void>, the value SPACES should be used where "eName(p(n))" or "nName(p(n))" is specified, as appropriate.

Procedure p(2c) has an sName of B'. This is a special case because it is the end of a section. In this case a special method p(2d) is inserted to indicate that the end of a section has been reached. B cannot be moved into EndMethodName in p(2a) as it would then indicate that the whole of section B had been executed when only the start of the section had been executed.

Next, the translation program adds the procedure code that will be executed when the program is called. This is triggered on reaching the first label in the program. The procedure code appears at lines 050–057 in Table 2. As noted above, the program must continue to function correctly even though it has been converted to a method. This code does that by using the procedure p(1) as the first section or paragraph in the program.

It should be noted that it is not necessary at this stage to know nName(p(1)), providing it is known by time transfer of control to it is required (that is, when a new label is reached). Hence, the set of procedures may be defined in the same pass of the code that generates the translated code. The CONTROL structure is used to determine if the procedure range has been completed properly. As will be explained in more detail below, if NextMethodName contains SPACES the program must end because an EXIT PROGRAM has been executed or the end of the program has been reached. Here, SPACES may be any label that is not found in a COBOL program. In the preferred embodiment of the present invention, SPACES is a label having only the character for blanks.

The translation program next goes through the various procedural statements and replaces those statements as described below. If the current statement declares a label that is in p(n), the statement must be replaced. There are several different cases that must be considered in this regard.

If the name appears as an nName(p(n)), termination code must be added to the class definition. Examples of this type of addition may be found in Table 2 at 180–183, 221–224, 245–248, and 270–273. In general, the inserted code has the form:

MOVE "eName(p(n))" TO EndMethodName
MOVE "nName(p(n))" TO NextMethodName
EXIT METHOD.
END METHOD "sName(p(n))".

This code is needed when a procedure ends, since an EXIT METHOD must be executed. The data item EndMethodName is set to indicate the label at which the method is ending. It is possible that this EXIT METHOD will not be the end of the current procedure, and NextMethodName is set up to contain the name of the method that must be called if the procedure has not finished.

As noted above, the end method name eName(p(2a)) is not placed in the EndMethodName field for line 17a because the procedure is incomplete. Section B refers to all the code between the Section B statement and the Section C statement. The name of Section B should only be placed in EndMethodName when all of the procedural code contained in Section B and its paragraphs has been executed. If the statement is at end of the section, an. additional method must be inserted to move in the correct EndMethodName. Without this method the controlling code cannot determine when the section has finished. It should be noted that the code inserted here cannot efficiently determine if the procedure should end.

Hence, If eName(p(n)) is declared by the current statement and p(n-1) is a paragraph within a section, a section terminating method must be inserted. An example of such an insertion is shown in Table 2 at lines 280–289. This code is needed to set EndMethodName to B, so that the whole of section B can be performed. This function can not be accomplished in the method B2 because it would not be then possible to perform B2 as a paragraph since, the wrong end method would be indicated on exit of B2.

Finally, if sName(p(n)) or nName(p(n)) is declared by the current statement, a method header is added to the class definition. The method header has the form:

```
METHOD-ID. sName(p(n)).
01 CONTROL.
    03 EndMethodName PIC X(30).
    03 NextMethodName PIC X(30).
PROCEDURE DIVISION RETURNING CONTROL.
```

Examples of this code addition may be found in Table 2 at lines 200–205, 230–235, 250–255, and 300–305. This code converts each procedure into a method.

It should be noted that more than one of the above code additions may be triggered by a single statement in the original program. In this case, each of the additions is made in the order indicated above.

The next class of statements that trigger code replacements are those that cause the execution of one of the procedures. Once again, there are several cases that must be considered. If the statement causes execution of a procedure p(n), and sName(p(n)) is not the same as eName(p(n)), the statement is replaced by code having the following form:

```
INVOKE SELF "sName(p(n))" RETURNING Control
PERFORM UNTIL EndMethodName = "eName(p(n+1))"
    IF NextMethodName NOT = SPACES
        PERFORM SELF NextMethodName RETURNING Control
    ELSE
        EXIT METHOD
```

-continued

```
    END-IF
END-PERFORM
```

An example of this code may be found at lines 125–132 in Table 2. This code invokes the method associated with the start point of the procedure (named sName(p(n))). If this method actually ends at the place where the procedure was supposed to end, then the procedure execution has completed. This fact can be determined by the value of the EndMethodName. It should be noted that if NextMethodName is SPACES, this code performs an EXIT METHOD because it is in a method.

If the statement causes execution of a procedure p(n), and sName(p(n)) is the same as eName(p(n)), the statement is replaced by code of the following form:

```
INVOKE SELF "sName(p(n))" RETURNING Control
IF NextMethodName = SPACES
    EXIT METHOD
END-IF
```

Examples of this code replacement may be found in Table 2 at lines 110–113, 120–123, and 130–133. This code invokes the method associated with the start point of the procedure (named sName(p(n))). There is no need to check the end point of this method because there can be no EXIT METHOD before the desired one unless the original program contained EXIT PROGRAM, in which case, NextMethodName is SPACES.

The next type of statements that must be replaced are those indicating program and section exits. If the statement is an EXIT SECTION, it is replaced by code of the following form:

MOVE "eName(p(n))" TO EndMethodName
MOVE "nName(p(n))" TO NextMethodName
EXIT METHOD.

Here, n is the procedure in which the EXIT SECTION is found. An EXIT SECTION must cause the method to be exited. This code is exactly the same as that inserted for a normal method end as described above. An example of this type of replacement is shown in Table 2 at lines 360–362.

If the statement is an EXIT PROGRAM, replace it with the code in the example below.

Example:
MOVE SPACES TO NextMethodName
EXIT METHOD.

An EXIT PROGRAM must cause the whole program to be exited. This is achieved by exiting the method with NextMethodName set to SPACES. This value of SPACES will propagate down all the invokes currently active. An example of this type of replacement is shown in Table 2 at lines 370–371.

Finally, If the statement is a GO TO, it is replaced by code of the following form:
MOVE SPACES TO EndMethodName
MOVE "sName(p(n))" TO NextMethodName
EXIT METHOD.

An example of this type of replacement may be found in Table 2 at lines 140–142. A GO TO must cause transfer of control to the new method. This is achieved by exiting the method with NextMethodName set to the name of the method to invoke next.

If a statement did not trigger action under one of the above described rules, it is merely copied to the class definition.

At the end of the program, the current procedure p(n) requires method terminating code as follows:
MOVE "eName(p(n))" TO EndMethodName
MOVE SPACES TO NextMethodName
EXIT METHOD.
END METHOD "eName(p(n))".

This code is needed since there is no label at the end of the program to indicate the end of the last procedure even though this is still a valid place for a procedure to end. In addition, code indicating the end of the class definition (lines 998–999 in Table 2) must be added to the class definition.

It should be clear from the above example that COBOL programs differ from other programs in that the main program is implicitly defined in the program. The main program in the example shown above is equivalent to the program consisting of the single statement PERFORM A THRU C. In this case, the main program and the procedures are intermixed. This type of program structure will be referred to as a program in which the main program is implicitly defined by the procedures. It is to be understood that the term main program includes those cases in which the main program is implicitly defined.

While the preferred embodiment of the present invention stores the entire set of procedures p(n) in memory, it will be apparent to those skilled in the art that from the above discussion that each procedure need only be stored temporarily. As the procedure's components are determined and used, they storage space may be over written.

The above described embodiments of the present invention converted all of the procedures to methods in the object class definition. However, it will be apparent to those skilled in the art from the above discussion that compiler directives or the like can be used o specify which procedures are to be converted to methods.

The algorithm described in the above discussion may generate some code that is superfluous in that the code can be removed without altering the operation of the code. This code does, however, reduce the operating speed of the program. It will be apparent to those skilled in the art that this superfluous code can be removed by a code optimizer of conventional design. For example: (i) when a statement that causes procedure p(n) to be executed is encountered, if it can be determined (either through analysis of the program or through user direction) that the only exit method that can be executed is the exit method that corresponds to the end of procedure p(n), even if sName(p(n)) t eName(p(n)), then the processor may insert the code associated with the case when sName(p(n)) =eName(p(n)); (ii) if it can be determined that procedures may be sequentially combined (because the execution flow invariably and exclusively causes a second procedure to follow a first procedure), then the number of method in the resultant code may be reduced.

Accordingly, a translation program for converting a conventional procedural program into a class definition for an object class in an object-oriented programming language has been described. Various modifications to the present invention will become apparent to those skilled in the art from the foregoing description and accompanying drawings. Accordingly, the present invention is to be limited solely by the scope of the following claims.

What is claimed is:

1. A method of operating a computer to generate an object class definition form a procedural program having a main program and a plurality of procedures that are to be converted to methods in the object class definition, said method comprising the steps of:

determining a set of procedures, said set including at least one of said procedures;

storing the identity of at least one of said procedures in said set in said computer; and generating an object definition having a main method that reproduces the behavior exhibited by said procedural program when control was transferred to an entry point in said main program when said main method is invoked in an object of said object class;

wherein said procedural program comprises a COBOL program and wherein said step of storing the identity of said procedures comprises storing first, second, and third names for each procedure, said first name comprising the identity of the label that marks the start of the procedure, said second name comprising the name of the last label within the range of the procedure, and said third name comprising the name of the label following the last label within the range of the procedure.

2. The method of claim 1 further comprising the step of placing code in said class definition, said code causing a transfer of control to one of said procedures in said set of procedures corresponding to each GO TO statement in said procedural program.

3. The method of claim 1 further comprising the step of adding method terminating code to said object class definition for each statement in said procedural program which declares one of said second names.

4. The method of claim 1 further comprising the step of adding method header code to said object class definition for each statement in said procedural program which declares one of said first names or one of said third names.

5. The method of claim 1 further comprising the step of adding code to said object class definition corresponding to each statement in said procedural program that causes the execution of one of said procedures in said set, said code invoking one of said methods in said object class definition.

* * * * *

UNITED STATES PATENT AND TRADEMARK OFFICE
CERTIFICATE OF CORRECTION

PATENT NO.      : 6,526,569 B1
DATED           : February 25, 2003
INVENTOR(S)     : Obin et al.

It is certified that error appears in the above-identified patent and that said Letters Patent is hereby corrected as shown below:

<u>Title page,</u>
Item [57], ABSTRACT,
Line 11, insert -- to -- after "corresponding"

<u>Column 2,</u>
Line 8, insert -- the -- between "that" and "author"

<u>Column 5,</u>
Line 5, remove commas "," on each side of "usually"

<u>Column 6,</u>
Line 28, replace "paragraph" with -- the paragraphs --

<u>Column 7,</u>
Line 45, insert -- the -- between "by" and "time"

<u>Column 8,</u>
Line 19, insert -- the -- between "at" and "end"
Line 31, remove "then" at end of line <u>Column 10,</u>
Line 27, remove "that" between "art" and "from"
Line 34, replace "o" with -- to --
Line 47, replace "t" with -- ≠ -- after "sName(p(n))"
Line 53, replace "method" with -- methods --

Signed and Sealed this

Fifth Day of August, 2003

JAMES E. ROGAN
*Director of the United States Patent and Trademark Office*